T. G. WALPUSKI AND W. F. KOCH.
FLAG SUPPORTING ATTACHMENT FOR FLAGPOLES.
APPLICATION FILED APR. 10, 1919.
1,324,439.
Patented Dec. 9, 1919.
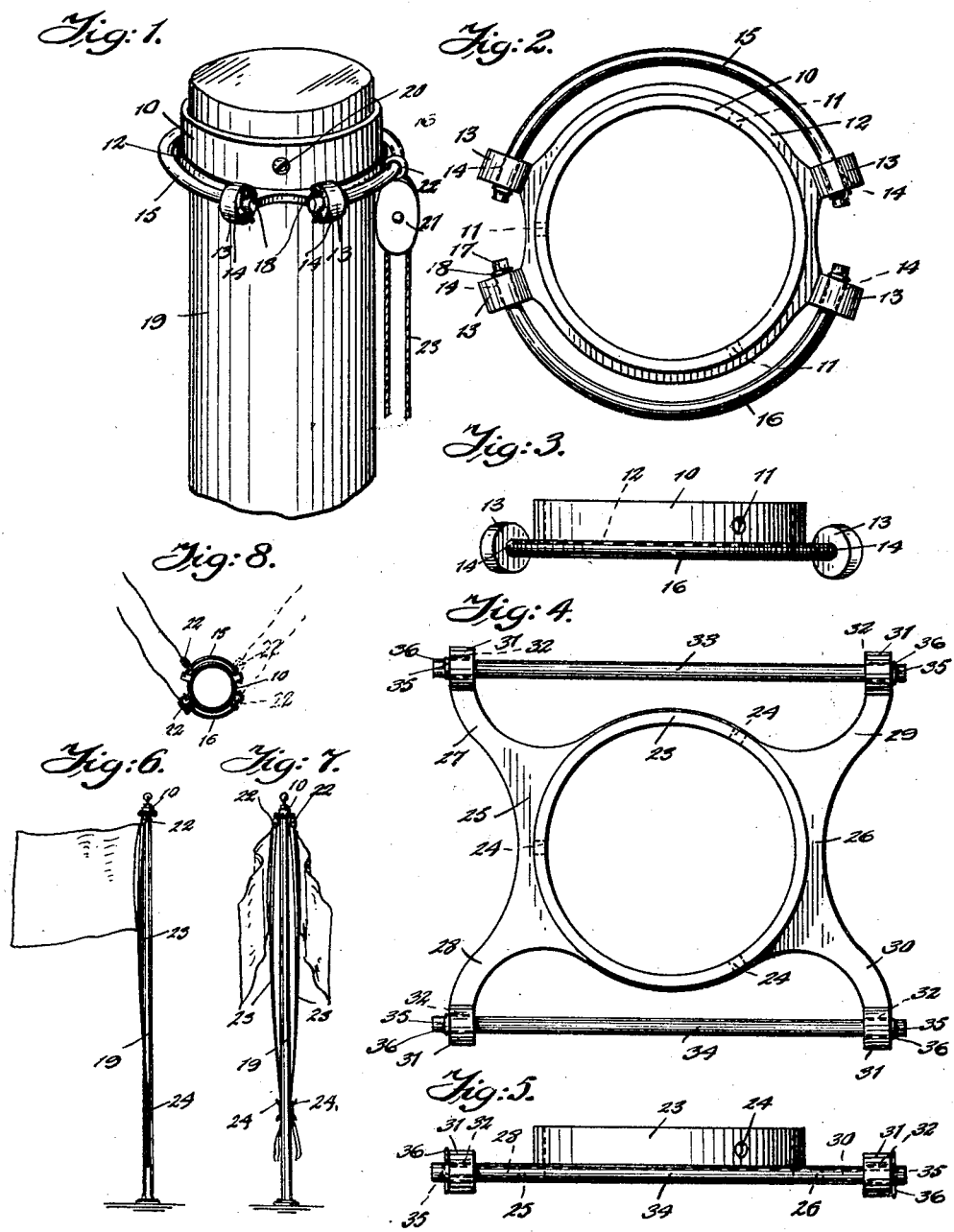

//UNITED STATES PATENT OFFICE.

THEODORE G. WALPUSKI, OF NEW YORK, N. Y., AND WILLIAM F. KOCH, OF WEST NEW YORK, NEW JERSEY, ASSIGNORS TO AMERICAN MOROCCO CASE COMPANY, OF NEW YORK, N. Y., A CORPORATION.

FLAG-SUPPORTING ATTACHMENT FOR FLAGPOLES.

1,324,439.   Specification of Letters Patent.   Patented Dec. 9, 1919.

Application filed April 10, 1919. Serial No. 288,982.

*To all whom it may concern:*

Be it known that we, THEODORE G. WALPUSKI and WILLIAM F. KOCH, citizens of the United States, the former a resident of the borough of Manhattan, in the city, county, and State of New York, and the latter a resident of West New York, N. J., have invented certain new and useful Improvements in Flag-Supporting Attachments for Flag-poles, of which the following is a specification.

The present invention relates to improvements in flag supporting attachments for flag poles and has for an object to provide such a device which may be readily attached to a flag pole and with which one or more flags may be suspended vertically, and in a manner which will permit of the attached edge of the flag moving with the direction of the wind. With our improved attachment, the flag will always hang gracefully and will not be subject to twisting strains, by shifting winds, as is the case with the present means of supporting flags upon poles, in which the attached edge of the flag is immovably secured.

With these and other objects in view, embodiments of our invention are shown in the accompanying drawings, and these embodiments will be hereinafter more fully described with reference thereto, and the invention will be finally pointed out in the claims.

In the accompanying drawings:

Figure 1 is a perspective view showing the end portion of a flag pole with one embodiment of our invention in place thereon;

Fig. 2 is a plan view of one embodiment of our invention;

Fig. 3 is a side view thereof;

Fig. 4 is a plan view of a modified form of construction;

Fig. 5 is a side view thereof;

Fig. 6 is a front view of a flag pole provided with our improved attachment and having a flag supported thereon;

Fig. 7 is a side view thereof showing two flags supported thereby; and

Fig. 8 is a plan view showing two flags supported.

Similar reference characters indicate corresponding parts throughout the several figures of the drawings.

Referring to the drawings, and more particularly to Figs. 1 to 3 thereof, the embodiment of our invention shown therein, comprises a cylindrical sleeve or collar 10, having a plurality of spaced screw holes 11 therein, and provided at its lower end with a lateral projecting flange 12, having formed thereon at opposite sides of the collar and spaced from each other, pairs of ears or lugs 13 having passages 14 therethrough, annularly arranged relatively to the collar.

Arcuate shaped rods or bars 15 and 16 formed upon a curve circumferential to the collar, have their respective ends engaged in the lugs 13, their projecting extremities being provided with holes 17 in which are engaged cotter pins or bolts 18 to retain the bars in place. The engagement of the bars with the lugs is such that they maintain a lateral position and are annularly spaced from the periphery of the flange 12.

The attachment is placed upon the flag pole 19 as shown in Fig. 1 and is secured by means of screws 20 engaging the pole through the holes 11. These holes 11 may, if desired, be screw threaded and in which case, set screws may be provided therein to bear upon the pole.

In Figs. 4 and 5, we have illustrated a slightly modified form of construction which comprises a collar 23 having spaced screw holes 24 and provided at its lower end with lateral projecting portions 25 and 26, having arms 27, 28, 29 and 30 respectively extending in curved relation therefrom and provided at their ends with ears or lugs 31, having passages 32 therethrough, the passages of the arms 27 and 29 being in axial alinement and supporting a straight bar 33 having its ends disposed therein, while the passages of the arms 28 and 30 are in axial alinement and support a straight bar 34, parallel to the bar 33 and in the same horizontal plane, the said bars being provided at their projecting extremities with holes 25 in which are engaged cotter pins 26 to secure the position of the said bars.

A pulley 21 having an eye 22 is slidably secured to one of the lateral bars as indicated in Fig. 1 and a rope 23 is carried therethrough and is adapted to be secured to a hook 24 provided near the base of the pole 19, the flag being secured to this rope. When two flags are supported upon the pole, a similar arrangement is connected to the opposed lateral bars, and two or more flags may be supported upon the same bar by providing a corresponding number of pulleys and ropes. As shown in Fig. 8, the pulley and the flags will shift along the bars according to the direction of the wind, so that the flag will not wind about the pole, and will always maintain a proper position relatively to the pole.

We have illustrated and described preferred and satisfactory embodiments of our invention, but it is obvious that changes may be made therein within the spirit and scope thereof as defined in the appended claims.

We claim:

1. A flag supporting attachment for flag poles, comprising a collar portion, projecting portions extending therefrom, and a bar supported by said projecting portions in spaced relation to said collar.

2. A flag supporting attachment for flag poles, comprising a collar portion, projecting portions extending therefrom, and a pair of flag supporting bars disposed at each side of said collar and supported in said projecting portions in spaced relation to said collar.

3. In combination with a flag pole, a flag supporting attachment comprising a collar engaged over said flag pole, and flag supporting bars supported upon said collar in spaced relation thereto and disposed in a plane at right angles to the axis of said pole.

4. A flag supporting attachment for flag poles, comprising a collar portion, projecting portions extending therefrom, a bar supported by said projecting portions in spaced relation to said collar, and flag supporting means slidably disposed on said bar.

In testimony that we claim the foregoing as our invention, we have signed our names hereunder.

THEODORE G. WALPUSKI.
WM. F. KOCH.